United States Patent Office 3,058,976
Patented Oct. 16, 1962

3,058,976
3,3-DIMETHOXY-20-SPIROX-5(10)-ENE-21-ONE
AND PROCESS OF PREPARATION
Arthur A. Patchett, Metuchen, N.J., assignor to Merck & Co., Inc., Rahway, N.J., a corporation of New Jersey
No Drawing. Filed June 27, 1960, Ser. No. 38,752
7 Claims. (Cl. 260—239.57)

This invention is concerned generally with novel steroids and processes of preparing the same. More particularly, it relates to novel 19-nor-22-halogen-20-spirox-4-ene-3,21-diones, to the 7α-alkanoylthio derivatives thereof, and to closely related compounds, which steroids possess useful therapeutic properties as aldosterone inhibitors. This invention also relates to pharmaceutical compositions containing these novel steroid compounds.

The name "20-spiroxane" is used to designate compounds having the following ring structure:

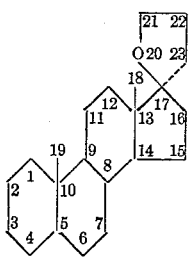

The novel "19-nor-22-halogen - 20 - spirox-4-ene-3,21-diones" which form the subject of the present invention accordingly are compounds having the following structural formula:

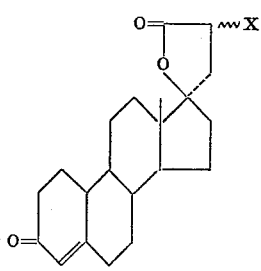

wherein X stands for a halogen atom.

This invention also contemplates the preparation of additional compounds of the foregoing structure, having other substituents in the ring, and more particularly, the 11-oxygenated and the 7α-lower alkanoylthio derivatives, as well as the lower alkyl, cyclohexyl and benzyl 3-enol ethers thereof. Among the radicals comprehended by the expression "lower alkanoyl" are formyl, acetyl, propionyl, butyryl, valeryl, hexanoyl, heptanoyl, and branched-chain isomers thereof, said alkanoyl radicals being the acyl radicals of alkanoic acids containing fewer than nine carbon atoms.

These novel steroids block the salt-retaining effects of aldosterone and other salt-retaining steroids so as to be useful in the treatment of diseases such as congestive heart failure, nephrosis and cirrhosis of the kidney in which aldosterone secretion is increased.

In preparing my novel chemical compounds, the starting material utilized is the 3-methoxy-17α-[2'-carboxyethyl]-2,5(10)-androstadiene-17β-ol, which has the following formula:

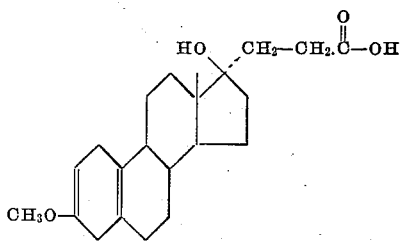

However, it is clear to those skilled in the art that starting materials of the above structure which have other substituents in the ring and especially the 11-hydroxy substituent, may be similarly converted to the desired end products.

It has been found that 3-methoxy-17α-[2'-carboxyethyl]-2,5(10)-androstadiene-17β-ol may be reacted with anhydrous methanol in the presence of an acid catalyst, for example, p-toluene sulfonic acid, to give 3,3-dimethoxy-20-spirox-5(10)-ene-21-one, which has the following structure:

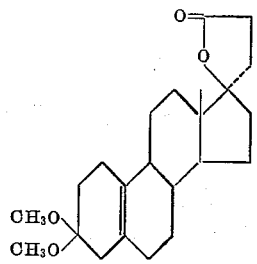

Upon treatment of 3,3-dimethoxy-20-spirox-5(10)-ene-21-one with an oxalate ester and a non-aqueous strong base such as sodium hydride, there is formed 3,3-dimethoxy-22-methoxyalyl-20-spirox-5(10)-ene-21-one, which has the following structure:

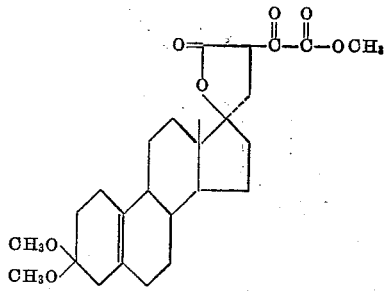

The 3,3-dimethoxy - 22 - fluoro-20-spirox-5(10)-ene-21-one which has the following structure:

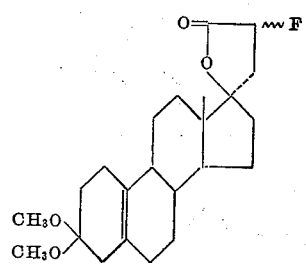

is prepared by contacting 3,3-dimethoxy-22-methoxalyl-20-spirox-5(10)-ene-21-one with an alkali metal oxide to form the enolate, which on reaction with perchloryl fluoride gives the 22α-fluoro-22-alkoxalyl derivative. The latter compound is then converted into a 3-3-dimethoxy-22-fluoro-20-spirox-5(10)-ene-21-one on treatment with an alkali metal alkoxide.

The 3,3 - dimethoxy-22-bromo-20-spirox-5(10)-ene-21-one, which has the following structure:

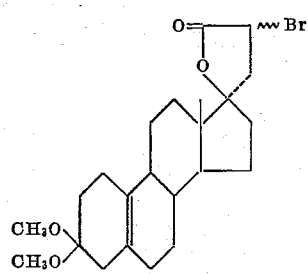

is obtained by treating 3,3-dimethoxy-22-methoxalyl-20-spirox-5(10)-ene-21-one first with bromine in the presence of an organic base such as pyridine, and then with an alkali metal alkoxide.

The 3,3 - dimethoxy-22-chloro-20-spirox-5(10)-ene-21-one which has the following structure:

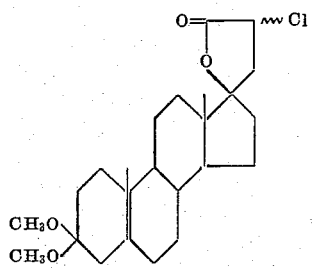

is formed by treating 3,3-dimethoxy-22-methoxalyl-20-spirox-5(10)-ene-21-one first with chlorine in the presence of an organic base such as pyridine, and then with an alkali metal alkoxide.

The 3,3-dimethoxy-22-halo-20-spirox-5(10)-ene-21-one, dissolved in a suitable solvent such as acetone, is treated with an acid catalyst, for example, p-toluenesulfonic acid, to give 22-halo-19-nor-20-spirox-4-ene-3,21-dione which has the following structure:

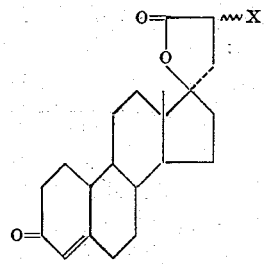

wherein X stands for a halogen atom.

Heating 22-halo-19-nor-20-spirox-4-ene-3,21-dione with chloranil in a solvent such as t-butanol gives 22-halo-19-nor-20-spirox-4,6-diene-3,21-dione which has the following structure:

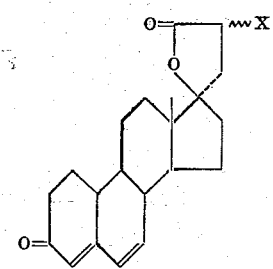

wherein X stands for a halogen atom.

The 22-halo-19-nor-20-spirox-4,6-diene-3,21-dione is heated with a lower thioalkanoic acid to give 7α-lower alkanoylthio - 22 - halo - 19 - nor-20-spirox-4-ene-3,21-dione which has the following structure:

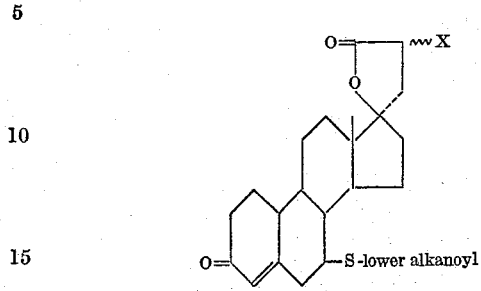

wherein X stands for a halogen atom.

The above reaction proceeds fairly rapidly at elevated temperatures, such as those in excess of 50° C. and can be carried out optionally under the influence of ultraviolet light. In carrying out the addition reaction with lower boiling thioalkanoic acids, such as thioacetic acid, it is convenient to conduct the reaction at the reflux temperature of the reaction mixture; whereas with higher boiling thioalkanoic acids it is convenient to conduct the reaction at a temperature of about 90–100° C. Heating periods of up to a few hours are sufficient to achieve substantial conversion to the desired reaction products. Typically, the desired compound is obtained in a satisfactory state of purity by direct filtration of the cooled reaction mixture, preceded, where necessary by removal of excess thioalkanoic acid. If desired, however, the reaction product can be purified by chromatography using adsorbents such as silica gel or acid-washed alumina, followed by elution with mixtures of ethyl acetate in benzene.

The addition of thioalkanoic acids to the 6,7-double bond of the starting materials employed in the practice of this invention proceeds under steric influences such as that of the stereoisomers formed, one is obtained in predominant amount, which, in each case, has been characterized herein as possessing the α-configuration of the 7-acylthio group. However, the designated configuration of the 7-acylthio group is based upon an analysis of molecular rotation data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

A further embodiment of our invention comprises novel pharmaceutical compositions containing these 22-halo-19-nor-20-spirox-4-ene-3,21-diones exemplified in the foregoing structures. A preferred embodiment of our invention comprises pharmaceutical compositions containing these 22-fluoro - 19 - nor-20-spirox-4-ene-3,21-dione compounds combined with diuretics such as chlorothiazide, hydrochlorothiazide and related compounds.

The following examples illustrate methods of carrying out the present invention but it is to be understood that these examples are given for purposes of illustration and not of limitation.

*Example 1*

100 mg. of 3-methoxy-17α-[2'-carboxyethyl]-2,5(10)-androstadiene-17β-ol is dissolved in 5 cc. of anhydrous methanol. To this solution is added about 10 mg. of anhydrous p-toluenesulfonic acid. The reaction mixture is left at room temperature for 45 minutes and then about 5 drops of pyridine is added to destroy the acid. The methanol is then blown off with nitrogen and the residue taken up in ether and washed with bicarbonate solution and water. Chromatography over alumina affords 3,3-dimethoxy-20-spirox-5(10)-ene-21-one, which has the following structure:

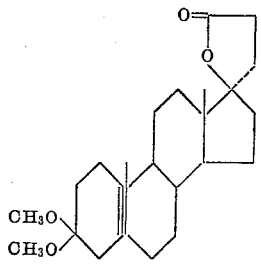

*Example 2*

Dimethyl oxalate (3.5 gms.) is dissolved in 30 cc. of benzene. The solution is then azeotropically dried to a volume of 25 cc. Sodium hydride (1.050 g.), as a 52.7% dispersion in oil, is added. A slight reaction occurs. To this grey suspension is added 687 mg. of 3,3-dimethoxy-20-spirox-5(10)-ene-21-one. The reaction mixture is held at 40° C. overnight with magnetic stirring. It is then diluted with an equal volume of ether and centrifuged. The precipitate is washed three times with an equal volume of ether. The sodium enolate is then covered with about 10 cc. of benzene and a saturated solution of sodium dihydrogen phosphate (pH 4) is added as quickly as possible. The separated aqueous layer is extracted two more times with ether. The combined organic layers are dried and concentrated in vacuo. The product is recrystallized several times from a mixture of ether and petroleum ether to give 3,3-dimethoxy-22-[methoxalyl]-20-spirox-5(10)-ene-21-one, which has the following

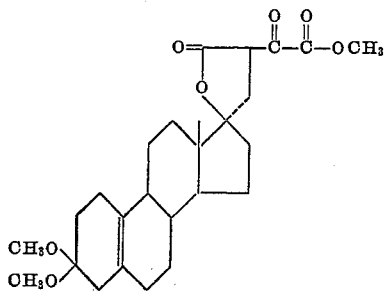

*Example 3*

A solution of 100 mg. of 3,3-dimethoxy-2-[methoxalyl]-20-spirox-5(10)-ene-21-one, dissolved in 6 cc. of pyridine, is cooled to 0° C. Sodium ethoxide (0.26 cc. of 1 M sodium ethoxide in ethanol) is then added and the resultant solution is flushed with nitrogen for about 2 minutes. With operations conducted behind a shield, perchloryl fluoride is then bubbled into the reaction mixture for 15 minutes at 0° C. and the system is again flushed with nitrogen for about two minutes. The mixture is then poured into water and extracted with ether. The combined ether layers are washed with water and dried, and the solvent evaporated at room temperature using a rotary evaporator. Final traces of solvent are removed under vacuum.

The residue is dissolved in 4 cc. of absolute ethanol, and 1 cc. of 1 M sodium ethoxide in ethanol is added. The solution is then allowed to stand at room temperature for 2 hours. A precipitate forms. The reaction mixture is carefully acidified, maintaining the temperature at 0° C., and then poured into water. The mixture is extracted with ether and the ether extract is dried and concentrated in vacuo to give a residue of the crude 3,3-dimethoxy-22-fluoro-20-spirox-5(10)-ene-21-one, having the structure indicated below, which is suitable for the next step of the synthesis without further purification.

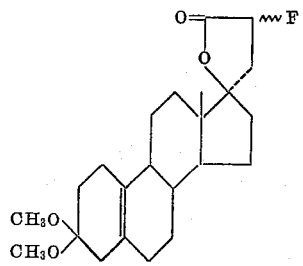

*Example 4*

A solution of 3 millimoles of 3,3-dimethoxy-22-methoxalyl-20-spirox-5(10)-ene-21-one, and 3.05 millimoles of pyridine in 25 ml. of dry benzene is cooled to 0° C. To this solution is added slowly with stirring 3 millimoles of bromine in 25 ml. benzene. The reacting mixture is allowed to stand for 5 minutes at room temperature and is then poured into water and ether. The organic solvent layer is washed several times with water, dried and then evaporated in vacuo at a temperature less than 35° C. The residue is taken up in 35 ml. of dry methanol cooled to 0° C. and 2 ml. of 2 N sodium methoxide is then added. The mixture is allowed to stand at room temperature for 2 hours and is then acidified with aqueous sodium dihydrogen phosphate in the cold. Most of the solvent is then removed in vacuo and the residue is extracted with ether. The ether extract is washed, dried and concentrated in vacuo to give the crude 3,3-dimethoxy-22-bromo-20-spirox-5(10)-ene-21 - one having the structure indicated below, which is suitable for the next step of the synthesis without further purification.

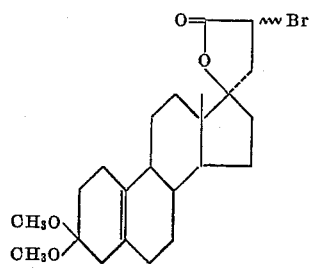

*Example 5*

A solution of 3 millimoles of 3,3-dimethoxy-22-methoxalyl-20-spirox-5(10)-ene-21-one, and 3.05 millimoles of pyridine in 25 ml. of dry benzene is cooled to 0° C. To this solution is added slowly with stirring 3 millimoles of chlorine in 25 ml. of benzene. The reacting mixture is allowed to stand for 15 minutes at room temperature and is then poured into water and ether. The organic solvent layer is washed several times with water, dried and then evaporated in vacuo at a temperature less than 35° C. The residue is taken up in 35 ml. of dry methanol cooled to 0° C. and 2 ml. of 2 N sodium methoxide in methanol is then added. The mixture is allowed to stand at room temperature for 2 hours and is then acidified with aqueous sodium dihydrogen phosphate in the cold. Most of the solvent is then removed in vacuo and the residue is extracted with ether. The ether extract is washed, dried and concentrated in vacuo to give the crude 3,3-dimethoxy-22-chloro - 20 - spirox 5(10)-ene-21-one having the structure indicated below, which is suitable for the next step of the synthesis without further purification.

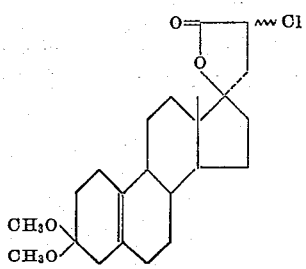

Example 6

Seventy-three milligrams of 3,3-dimethoxy-22-fluoro-20-spirox-5(10)-ene-21-one is dissolved in 4 cc. of acetone and 5 mg. of p-toluenesulfonic acid monohydrate in 1 cc. of acetone is added. The solution is warmed on the steam bath for one-half hour. It is then diluted with water and extracted three times with ether. The combined ether extracts are washed with water, dried and concentrated in vacuo. The residue is chromatographed over acid-washed alumina and eluated with mixtures of chloroform and ether. Recrystallization from a mixture of methylene chloride and ether affords the substantially pure 22-fluoro-19-nor-20-spirox-4-ene-3,21-dione, which has the following structure:

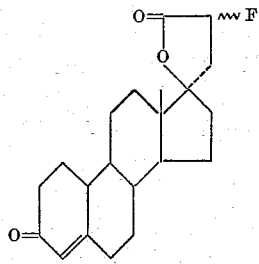

In accordance with the above procedure, but starting with 3,3-dimethoxy-22-bromo-20-spirox-5(10)-ene-21-one or 3,3-dimethoxy-22-chloro-20-spirox-5(10)ene-21-one in place of 3,3-dimethoxy-22-fluoro-20-spirox-5(10)-ene-21-one, there is obtained the 22-bromo-19-nor-20-spirox-4-ene-3,21-dione or 22-chloro-19-nor-20-spirox-4-ene, 3,21-dione, respectively.

Example 7

A suspension of 22-fluoro-19-nor-20-spirox-4-ene-3,21-dione (11.1 g.) and chloranil (24.3 g.) in 360 ml. of dry t-butanol is heated under reflux for three hours, protected by a blanket of nitrogen. The solvent is removed and the residue is dissolved in chloroform. The resulting solution is washed with 10% aqueous sodium bisulfite solution and then with 5% potassium hydroxide followed by water. The solution is dried over sodium sulfate and concentrated under reduced pressure to give 22-fluoro-19-nor-20-spirox-4,6-diene-3,21-dione which has the following structure:

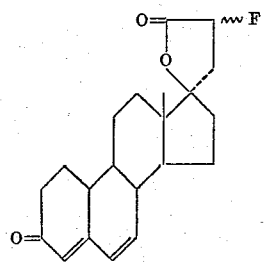

In accordance with the above procedure, but starting with 22-bromo-19-nor-20-spirox-4-ene-3,21-dione or 22-chloro-19-nor-20-spirox-4-ene-3,1-dione in place of 22-fluoro-19-nor-20-spirox-4-ene-3,21-dione, there is obtained the 22-bromo-19-nor-20-spirox-4,6-diene-3,21-dione or 22-chloro-19-nor-20-spirox-4,6-diene-3,21-dione, respectively.

Example 8

A solution of 80 mg. of 22-fluoro-19-nor-20-spirox-4,6-diene-3,21-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-22-fluoro-19-nor-20-spirox-4-ene-3,21-dione, which has the following structure:

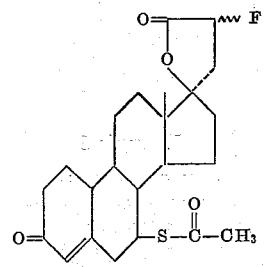

In accordance with the above procedure, but starting with 22-bromo-19-nor-20-spirox-4,6-diene-3,21-dione or 22-chloro-19-nor-20-spirox-4,6-diene-3,21-dione in place of 22-fluoro-19-nor-20-spirox-4,6-diene-3,21-dione, there is obtained the 7α-acetylthio-22-bromo-19-nor-20-spirox-4-ene-3,21-dione or 7α-acetylthio-22 - chloro - 19 - nor - 20-spirox-4-ene-3,21-dione respectively.

Example 9

A mixture of 1.5 parts by weight of 22-fluoro-19-nor-20-spirox-4,6-diene-3,21-dione and 1.5 parts by volume of thiopropionic acid is heated on the steam bath for 3 hours. After standing overnight, the reaction mixture is diluted with 25 parts by volume of ether. The crystals which form on cooling are separated and recrystallized from ether and petroleum ether to obtain 7α-propionylthio-22-fluoro-19-nor-20-spirox-4-ene - 3,21 - dione which has the following structure.

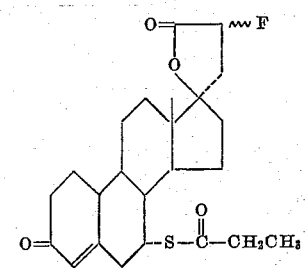

In accordance with the above procedure, but starting with 22-bromo-19-nor-20-spirox-4,6-diene-3,21-dione or 22-chloro-19-nor-20-spirox-4,6-diene-3,21-dione in place of 22-fluoro-19-nor-20-spirox-4,6-diene-3,1-dione, there is obtained the 7α-propionylthio-22-bromo-19-nor-20-spirox-4-ene-3,21-dione or the 7α-propionylthio-22-chloro-19-nor-20-spirox-4-ene-3,21-dione, respectively.

Various changes and modifications may be made in carrying out the present invention without departing from the spirit and scope thereof. Insofar as these changes and modifications are within the purview of the annexed claims, they are to be considered as part of my invention.

I claim:
1. 3,3-dimethoxy-20-spirox-5(10)-ene-21-one.
2. The process which comprises reacting 3-methoxy-17α-[2'-carboxyethyl]-2,5(10)-androstadiene-17β-ol with anhydrous methanol in the presence of an acid catalyst to form 3,3-dimethoxy-20-spirox-5(10)-ene-21-one.
3. The process which comprises reacting 3,3-dimethoxy-20-spirox-5(10)-ene-21-one with an oxalate ester and a non-aqueous strong base to form 3,3-dimethoxy-22-methoxalyl-20-spirox-5(10)-21-one.
4. The process which comprises reacting 3,3-dimethoxy-

22-methoxalyl-20-spirox-5(10)-ene-21-one sequentially with an alkali metal alkoxide, perchloryl fluoride and then with an alkali metal alkoxide to form 3,3-dimethoxy-22-fluoro-20-spirox-5(10)-ene-21-one.

5. The process which comprises reacting 3,3-dimethoxy-22-methoxalyl-20-spirox-5(10)-ene-21-one sequentially with bromine in the presence of an organic base, and then with an alkali metal alkoxide to form 3,3-dimethoxy-22-bromo-20-spirox-5(10)-ene-21-one.

6. The process which comprises reacting 3,3-dimethoxy-22-methoxalyl-20-spirox-5(10)-ene-21-one - sequentially with chlorine in the presence of an organic base, and then with an alkali metal alkoxide to form 3,3-dimethoxy-22-chloro-20-spirox-5(10)-ene-21-one.

7. The process which comprises reacting a 3,3-dimethoxy-22-halo-20-spirox-5(10)-ene-21-one with an acid to form the corresponding 22-halo-19-nor-20-spirox-4-ene-3,1-dione.

References Cited in the file of this patent
UNITED STATES PATENTS 2,859,222   Dodson et al. _____ Nov. 4, 1958

OTHER REFERENCES

Chemical and Engineering News, Sept. 16, 1957, pages 66–67.